(12) United States Patent
Berardi

(10) Patent No.: US 7,021,814 B2
(45) Date of Patent: Apr. 4, 2006

(54) SUPPORT EXTENSION FOR STAGE APPARATUS

(76) Inventor: Philip Berardi, P.O. Box 3372, Thousand Oaks, CA (US) 91359

( * ) Notice: Subject to any disclaimer, the term of this patent is extended or adjusted under 35 U.S.C. 154(b) by 0 days.

(21) Appl. No.: 10/692,557

(22) Filed: Oct. 23, 2003

(65) Prior Publication Data

US 2004/0084589 A1 May 6, 2004

Related U.S. Application Data

(60) Provisional application No. 60/420,896, filed on Oct. 23, 2002, provisional application No. 60/420,983, filed on Oct. 23, 2002.

(51) Int. Cl.
*H01R 33/00* (2006.01)

(52) U.S. Cl. .................. 362/650; 248/222.11

(58) Field of Classification Search .......... 248/222.52, 248/222.14, 223.41, 224.51, 224.61, 225.11; 224/324; 362/648, 649, 650, 652
See application file for complete search history.

(56) References Cited

U.S. PATENT DOCUMENTS

| | | | | |
|---|---|---|---|---|
| 419,611 A * | 1/1890 | McGrath | ............... | 248/222.52 |
| 2,099,116 A * | 11/1937 | Kalmbach | ............... | 294/103.1 |
| 2,859,710 A * | 11/1958 | Elsner | ............... | 248/502 |
| 4,106,680 A * | 8/1978 | Bott | ............... | 224/324 |
| 4,212,445 A * | 7/1980 | Hagen | ............... | 248/245 |
| 4,244,501 A * | 1/1981 | Ingram | ............... | 224/324 |
| 4,417,373 A * | 11/1983 | Keglewitsch | ............... | 24/458 |
| 4,602,756 A * | 7/1986 | Chatfield | ............... | 248/223.41 |
| 4,677,794 A * | 7/1987 | Parron et al. | ............... | 52/36.4 |
| RE33,596 E * | 5/1991 | Ennis | ............... | 211/105.2 |
| 5,154,385 A * | 10/1992 | Lindberg et al. | ............... | 248/225.11 |
| 5,199,836 A * | 4/1993 | Gogarty | ............... | 411/84 |
| 5,794,901 A * | 8/1998 | Sigel | ............... | 248/221.11 |
| 5,950,974 A * | 9/1999 | Hoffmann | ............... | 248/223.41 |
| 6,222,107 B1 * | 4/2001 | Lo | ............... | 84/421 |
| 6,425,509 B1 * | 7/2002 | Dean et al. | ............... | 224/324 |
| 6,543,974 B1 * | 4/2003 | Floe | ............... | 410/7 |
| 6,712,568 B1 * | 3/2004 | Snyder et al. | ............... | 410/104 |
| 6,719,156 B1 * | 4/2004 | Ellbogen et al. | ............... | 211/105.1 |

OTHER PUBLICATIONS

RobotUnits, Aluminum Extrusion PIL 5010, 5020 and 8080, www.robotunits.com, Aug. 12, 2004, 3 pages.
80/20 Inc., pp. 34, 39, 46 and 50 from on-line product catalog, 4 pages.
80/20 Inc., 1534 and 3034-Lite fractional extrusion, field bulletins, Apr. 15, 2002, 2 pages.
Harry C. Box, Set Lighting Technician's Handbook (1997), Chapter 4, 20 pages.
Manfrotto, Description of various Avenger products, www.manfrotto.com, Aug. 12, 2004, 6 pages.

* cited by examiner

*Primary Examiner*—Robert P. Olszewski
*Assistant Examiner*—Amy J. Sterling

(57) ABSTRACT

There is disclosed a support extension for mounting stage equipment. The support extension may be attached to a rail. The support extension may include a body and a bolt. The bolt fits into a channel in the rail. The support extension may be quickly easily attached to and removed from the rail by rotating or otherwise engaging the support extension.

12 Claims, 7 Drawing Sheets

SUPPORT EXTENSION FOR STAGE APPARATUS

RELATED APPLICATION INFORMATION

This application claims the benefit of U.S. Provisional Application No. 60/420,896 filed Oct. 23, 2002, which is incorporated herein by reference.

This application claims the benefit of U.S. Provisional Application No. 60/420,983 filed Oct. 23, 2002, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to support devices for stage apparatus.

2. Description of Related Art

Movies and television shows are an undeniable part of popular culture. To maintain a supply of movies and television shows for the public, many movies and television shows are made each year. At the heart of a movie or television show are images. To capture images that meet the often strict requirements of producers, directors and cinematographers, proper lighting may be used on the contents of a scene, whether the scene is of actors, animals, a set, and others. To achieve desirable images, lights of various kinds, grip equipment and other apparatus are set up to obtain an appropriate lighting effect.

DETAILED DESCRIPTION OF THE INVENTION

Throughout this description, the embodiments and examples shown should be considered as exemplars, rather than limitations on the apparatus and methods of the invention.

Support Extension

Figure 1A:
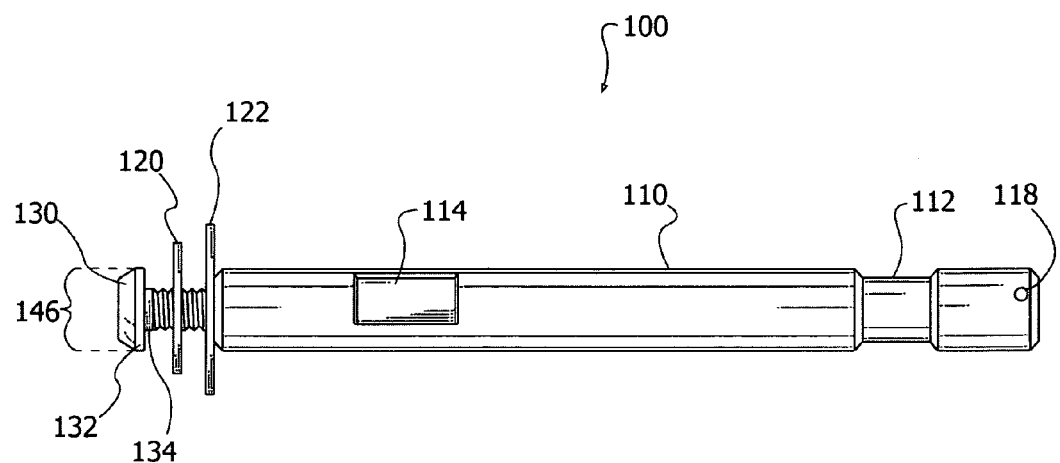
FIG. 1A is a top plan view of a support extension for stage apparatus according to the invention.
Figure 1B:
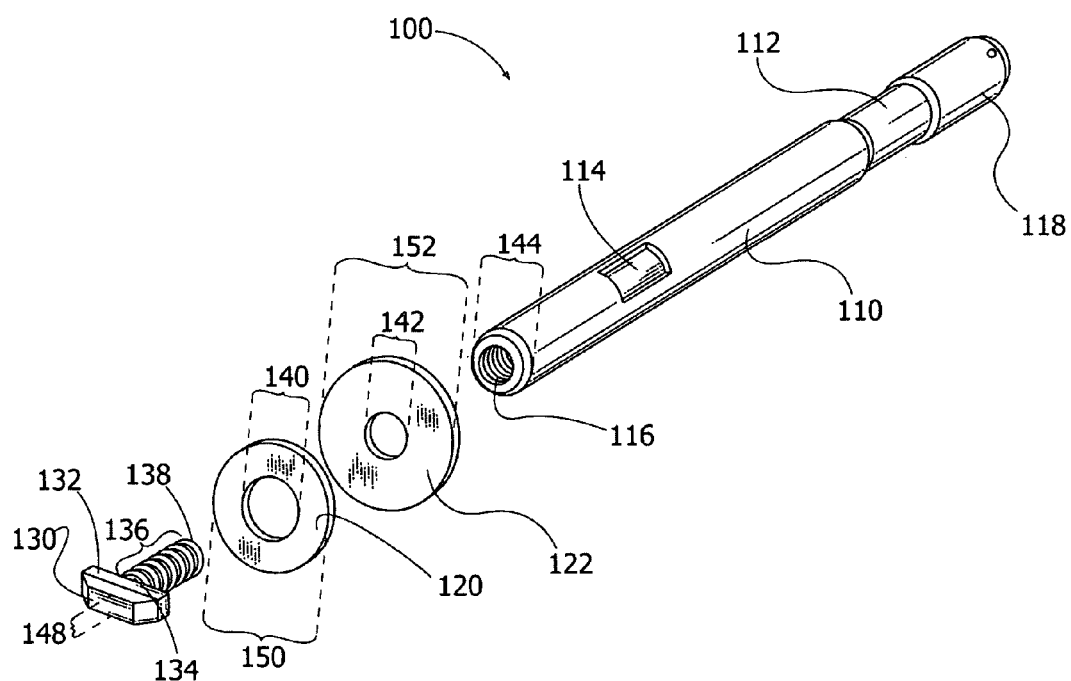
FIG. 1B is a top elevational exploded view of the components of a support extension for stage apparatus.

FIG. 1A is a top plan view of a support extension for stage apparatus according to the invention, and FIG. 1B is an exploded view of the components of a support extension for stage apparatus. The support extension may be a support pin 100. A support pin 100 may include a pin body 110, a t-bolt 130 and two washers 120 and 122.

The pin body 110 may be cylindrical and may have a circular cross section, as shown. The body of other versions of a support extension may have a cross section that is square, hexagonal, rectangular, irregular, or other shape. The body of these other versions may also be finned or other shape. The pin body 110 may include a pair of notches 114 that are in planes parallel to one another situated on opposite sides of the pin body 110. The pair of notches 114 may be configured so that wrenches and pliers may readily grasp the pin body 110. The pin body 110 may also include a wide groove 112 which extends around the entire circumference of the pin body 110. The wide groove 112 allows for the attachment of lighting equipment, grip equipment and other stage apparatus, including, for example, fresnel lamps, open faced lamps, scoop lamps, soft boxes, combination lighting equipment, flags, nets, filters, screens, reflectors and others. The wide groove 112 is configured so as to receive connections from a junior mount, a senior mount or other mount included with the lighting, grip and other stage equipment.

The pin body 110 may include a relatively small hole 118. The small hole 118 may be used to receive a cotter pin or other securing device which may be used to prevent lighting equipment and other apparatus from sliding off of the pin body 110. The small hole 118 may be used to attach to the pin body 110 a safety pin or cable for attached lighting equipment or other apparatus. The pin body 110 also includes a receiving cavity 116 into which the t-bolt 130 is inserted. The receiving cavity 116 incorporates a complementary, corresponding, and coordinated fastening technique that is also incorporated with the t-bolt 130. The receiving cavity 116 may include, for example, female screw threads. Other techniques may include a receiving device that corresponds to a spring loaded piston or pin or an expanding piston or pin that is part of a bolt or replaces the t-bolt 130. Other devices that enlarge or engage to meet and attach within receiving cavity 116 may be used. These other devices include butterfly bolts, spreading pins, expanding pistons, stems and others.

The pin body 110 may be constructed of a strong durable material such as metals, including, for example, without limitation, steel, as well as plastics and resins. The pin body 110 may be of a size sufficient to accommodate and support lighting equipment and other apparatus. Various sizes of support pin bodies 210 may be used to support varying sized lighting equipment and other stage apparatus.

The t-bolt 130 comprises a head 132, a collar 134 and a cylindrical portion 138. The head 132 is generally flat on its sides and is generally perpendicular to the center axis of the cylindrical portion 138. The head 132 is aligned so as to form a "T" shape with the cylindrical portion 138. The head 132 may have a length 146 and a width 148. By complementary, corresponding, and coordinated techniques, the cylindrical portion 138 may be secured into the receiving cavity 116 of the pin body 110. The cylindrical portion 138 employs a technique to fasten the t-bolt 130 to the pin body 110. The technique may be complementary screw threads such as male screw threads 136. Other techniques may include a spring loaded piston or pin, an expanding piston that enlarges to meet and attach within receiving cavity 116, butterfly bolts, and others.

Figure 1C:
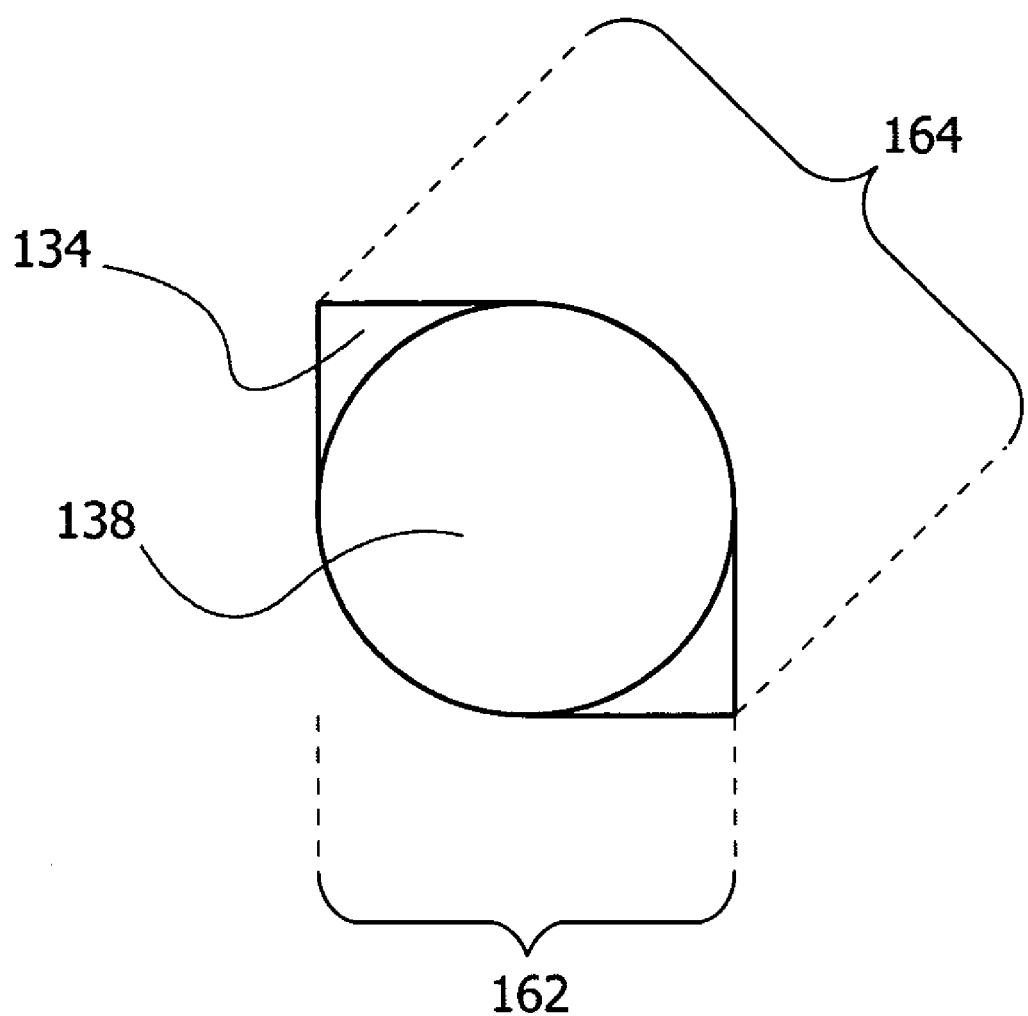
FIG. 1C is a cross sectional view of the collar of a bolt used in a support extension for stage apparatus.

FIG. 1C is a cross sectional view of the collar 134 of a bolt used in a support extension for stage apparatus. The collar 134 is located at the juncture of the head 132 and the cylindrical portion 138. The collar 134 may be shaped so as to serve as a cam when attaching the support pin 100 to and removing the support pin from a rail 200, as described below. The shape of the cam of the collar 134 is irregular. The shape of the cam may be such that the width of the cam 162 at the side and end of the head 132 of the t-bolt 130 are approximately equal to the diameter of the cylindrical portion 138. However, at it longest point along a diagonal, the length 164 of the cam collar 134 is greater than the diameter of the cylindrical portion 138. Described another way, the dimensions of the cam at the side and end of the head 132 are equal to the width 148 of the head 132, while the length of the cam of the collar 134 at its longest point is a size between the length 146 and width 148 of the head 132, and may be between 10 and 15 percent bigger than the width 148.

The t-bolt 130 may be zinc plated steel or other strong durable metal, and may also be constructed from sufficiently strong and durable plastics, resins or other materials. A sufficiently strong t-bolt 130 is a t-bolt that is able to accommodate the forces exerted on and through the t-bolt 130 when lighting and other stage equipment are coupled to the support pin 100 secured to a rail 200.

The washers 120 and 122 may be used to assist in the securing of the support pin 100 to the support rail. A first washer 122 may be a durable and strong material such as metals including aluminum, steel, and others. The first washer 122 may be of a sufficient strength to couple the support pin 100 to the rail as described below, and to maintain the coupling when lighting equipment or other apparatus is attached to the support pin 100. The first washer 122 may distribute some of the force of holding a piece of stage equipment from the pin body 110 to a rail 200.

A second washer 120 may be made of a plastics, resins including polyvinyl chloride (PVC), rubber, nylon, Teflon, polyurethane or other material. Use of second washer 120 may reduce wear or deterioration of the rail 200, and prevent the rail 200 from being scratched or worn down from continued use with support pin 100.

The washers 120 and 122 may have interior hole diameters 140 and 142 of sufficient size to allow the cylindrical portion 138 of t-bolt 130 to pass through. The interior hole diameter 142 in the washer 122 must also be smaller than the diameter 144 of the support pin body 110. The external diameter 152 of the washer 122 may be larger than the diameter 144 of the support pin body 110, and may be approximately two times the diameter 144 of the support pin body 110. The external diameter 150 of the washer 120 may be larger than the diameter 144 of the support pin body 110, and may be approximately one-and-a-half (1.5) times the diameter 144 of the support pin body 110. The external diameters 150 and 152 of the washers 120 and 122 may be the same, and the internal diameters 140 and 142 of the washers 120 and 122 may be the same.

A single washer that is two sided may be used in place of washers 122 and 120, such that a first side is a metal, and the second side is a plastic, is PVC, is rubber or is another material. In another embodiment, the washers 120 and 122 may be replaced by or augmented with a flange (not shown) that is integrated with and is part of the pin body 110 at the end of the pin body 110 adjacent to the cavity 116. A flange may have a plastic, PVC, rubber or other material coating or adhered thereto. This coating or adhered material may reduce wear on a rail 200 to which the support pin 100 may be attached.

In one embodiment, for example, the support pin body 110 is approximately 3.5 inches long and has a diameter of 0.625 inch; the washer 120 has an external diameter of 1 inch, an internal diameter of 0.4375 inch, and is 0.03125 inch thick; the washer 122 has an external diameter of 1.25 inches, an internal diameter of 0.375 inch, and is 0.03125 inch thick; the t-bolt 130 is approximately one inch long; the cylindrical portion 138 has a diameter of approximately 0.25 inch, and the cylindrical portion 138 may be 0.5625 inch long; the collar 134 may be 0.125 inches long, and has varying width to achieve its cam functionality, with the width at its greatest point being approximately 0.375 inch; and the head 132 is approximately 0.1875 inch long, 0.6875 inch wide, and 0.3125 inch high.

The support pin body 110 may be, for example, without limitation, when used in stage set applications, approximately from 3 to 8 inches long, and the diameter of the support pin body 110 may be larger and smaller than 0.625 inch, and may depend on the intended application and the length of the support pin body 110. The remaining components of the support pin 100 may be the same size as described in the prior paragraph, and may vary depending on the size of the support pin body 110 and/or the application. The sizes of all the components of support pin 100 may be increased or decreased depending on a particular application or use.

Support Rail

Figure 2A:
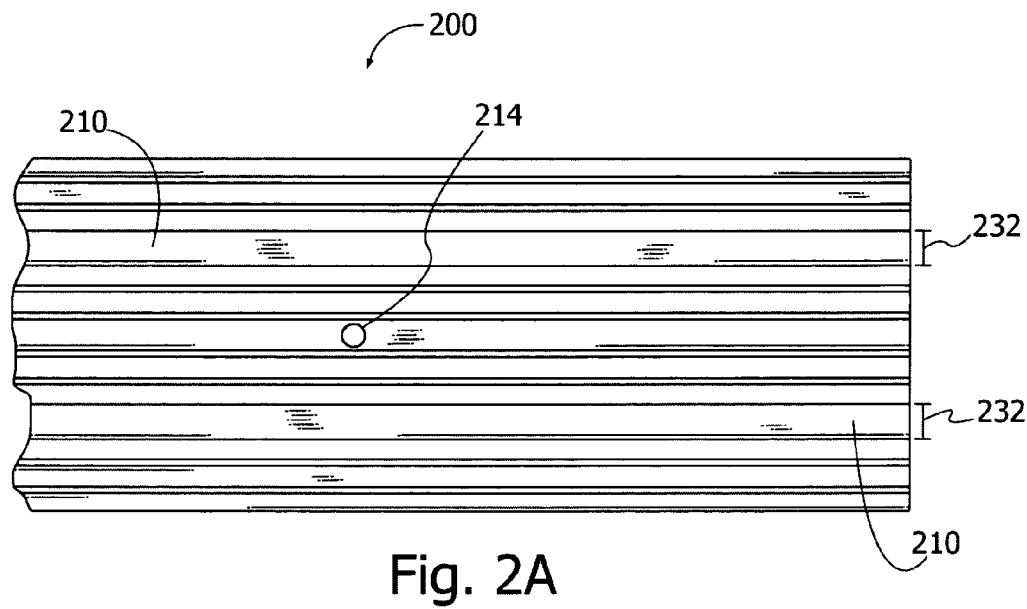
FIG. 2A is a top plan view of a support rail according to the invention.
Figure 2B:
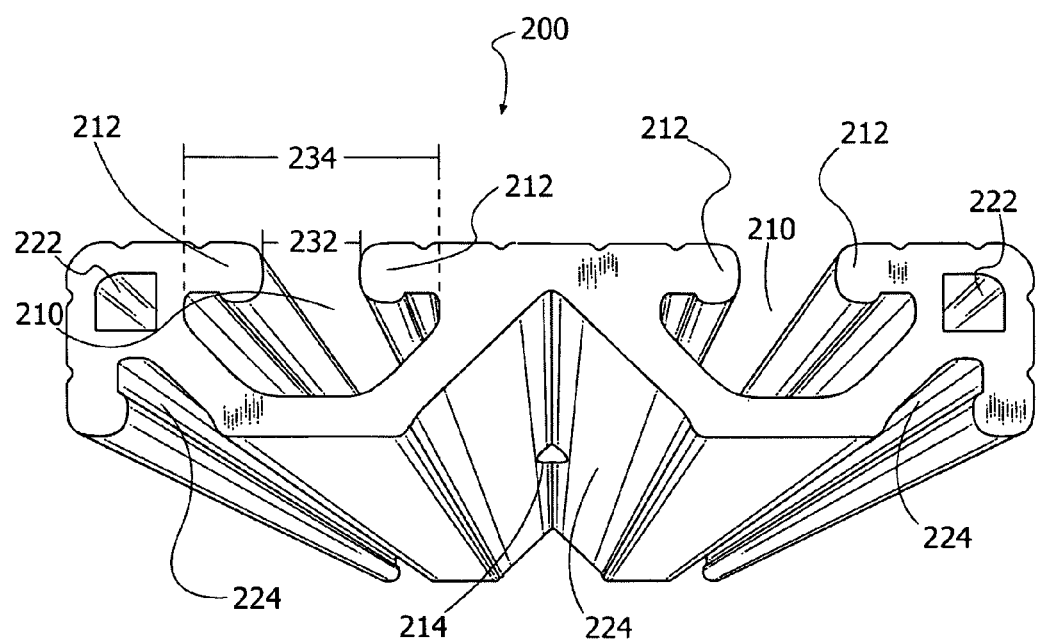
FIG. 2B is an end view of a support rail according to the invention

FIG. 2A is a top plan view of a rail 200 according to the invention, and FIG. 2B is an end view of the rail 200. The rail 200 includes two channels 210 into which support extensions such as support pins 100 and other mountable devices may be secured according to the methods described herein. The rail may have one or more holes 214 through which screws, bolts, nails and other fastening devices may be placed to attach the rail 200 to a wall or other structure. The holes 214 may be regularly spaced at intervals to provide for sufficiently secure fastening to a wall or other structure. The holes 214 may be spaced so as to correspond with the typical placement of studs, beams or other structure within a wall, including, for example, walls used in film, movie and theater sets.

As shown in FIG. 2B, the channels 210 may be generally "T" shaped or mushroom shaped. Other shaped channels may also be used, such as, for example, without limitation, "J", "C", "U", and "L" shaped channels. When other shaped channels are used, the t-bolt 130 may be replaced with bolts or other fastening devices such as pistons, pins and stems that have other shaped heads that are coordinated with the shape of the channel 210, or have ends that expand, extrude, or spread into the channel 210.

The rail 200 includes lips 212 adjacent to each side of the opening of the channel 210, such that each channel 210 has two lips 212. The size and shape of the channels 210 generally correspond to the proportions of the t-bolt 130 described above. The shape and size of the interior portion of the channel 210 corresponds to the size and shape of the head 132 of t-bolt 130. That is, the width 234 of the channel 210 is of a size sufficient to accommodate the length 146 of the head 132 of the t-bolt 130. The width 232 of the opening in channels 210 between lips 212 generally corresponds to the width 148 of the head 132 of the t-bolt 130 (which is approximately the same as the diameter of the cylindrical portion 138 of t-bolt 130). In addition, the thickness of the lips 212 may correspond to the height of the cam collars 134.

The rail 200 may be constructed from a strong, durable, lightweight material including metals such as aluminum, as well as plastics and resins. The rail 200 may include hollow areas 222 and/or cut-out or vacant areas 224. Areas 222 and 224 may reduce the weight of the rail 200, and may reduce the amount of material from which the rail 200 is formed, thus, reducing the cost of manufacture of the rail 200. The rail 200 may be cast, extruded or constructed in other ways.

The rail 200 may be a useful length, and may depend on a particular application or use. When used in stage sets, for example, the rail 200 may be a convenient length, such as 2, 4, 6 and 8 feet.

In one example implementation, the rail 200 is approximately 3 inches wide and about 0.625 inch high; the width of the opening of the channels 210 is approximately 0.3125 inch, and the channels 210 are approximately 0.8125 inch wide at their widest point; and the height of the channels 210 between the lips 212 and the bottom of the channel 210 at its highest point is approximately 0.3125 inch.

Although depicted as having two channels, 210, the rail 200 may have a single channel or may have more than two channels.

Support Extension and Rail

Figure 3A:
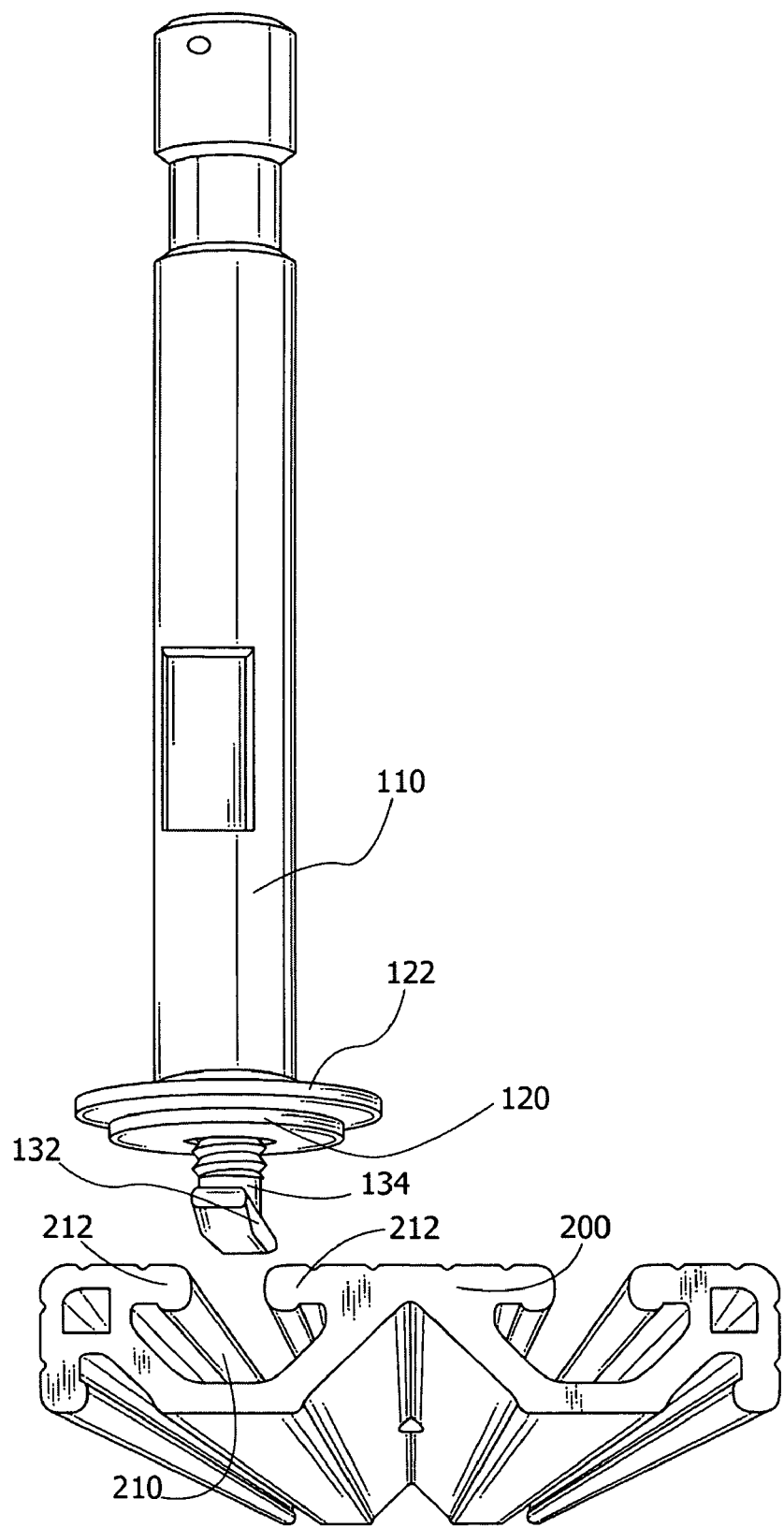
FIG. 3A is a side view of a support extension for stage apparatus aligned in a channel in a support rail according to the invention.

FIG. 3A is a side view showing the support pin 100 for stage apparatus aligned for insertion into the channel 210 in the rail 200. When placing the support pin 100 or other support extension into the rail 200, the t-bolt 130 may be unscrewed a sufficient distance from or out of the cavity 116 so that there is enough distance between the head 132 of the t-bolt 130 from the edge of the pin body 110 to allow the head 132 to fit in the channel 210 under the lips 212. The support pin 100 may be placed into the channel 210 by aligning the head 132 of t-bolt 130 with the opening of the channel 210 between the lips 212. The support pin 100 is pushed down into the channel 210 so that the head 132 of t-bolt 130 is placed into the channel 210 between the lips 212. The pin body 110 is then rotated to screw the t-bolt 130 into the pin body 110. This allows a user to quickly easily attach the support pin 100 to the rail 200. The rotating may be achieved by hand and/or with a wrench, pliers or other tool. The rotating may be started by hand and finished with a tool.

In other embodiments, the pin body may be otherwise engaged to quickly easily attach the support pin 100 to the rail 200. The engaging may be achieved by pushing or pressing a portion of the support pin or other support extension to activate the complementary technique employed.

Figure 3B:
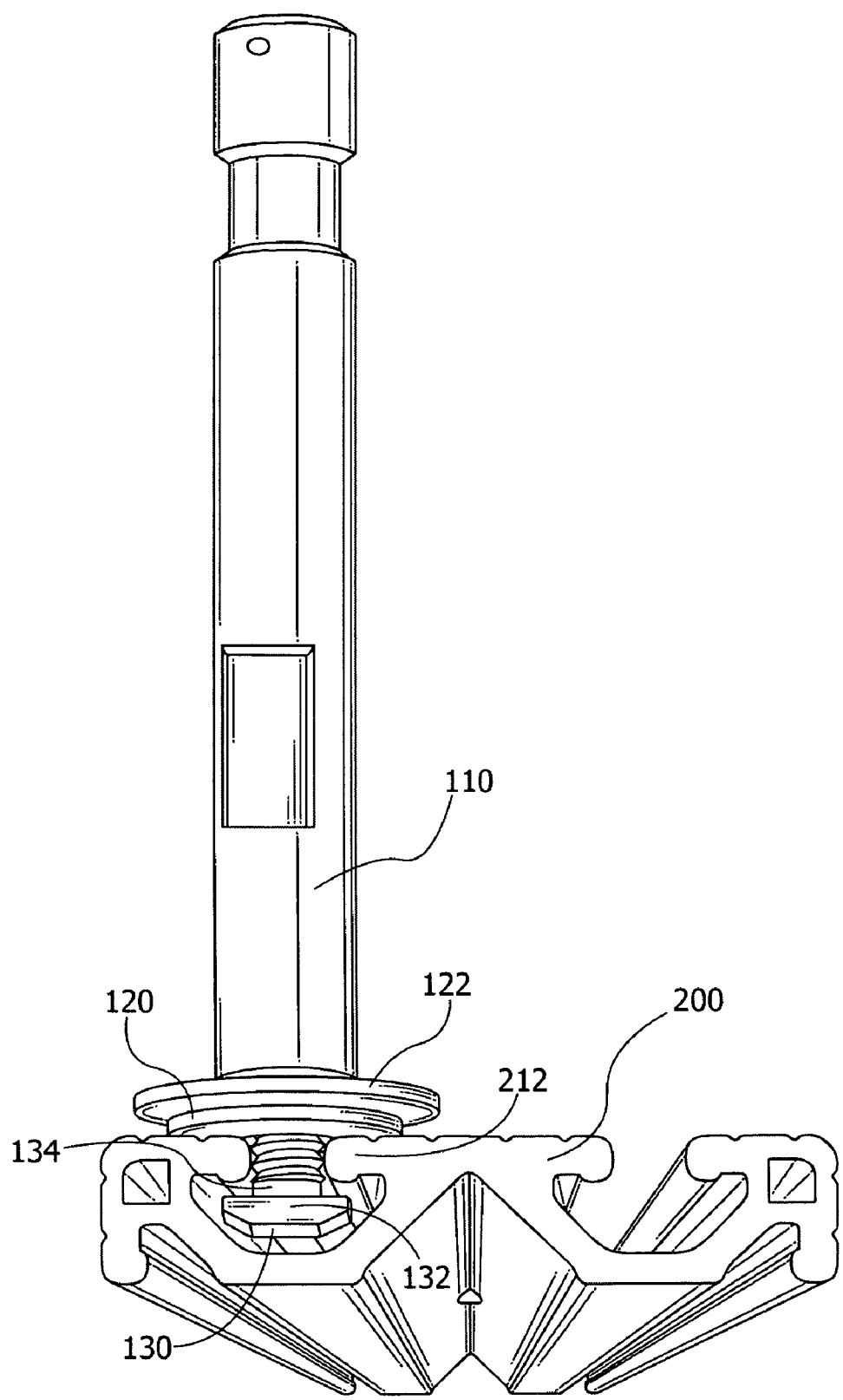
FIG. 3B is a side view of a support extension for stage apparatus placed into a support rail according to the invention.
Figure 3C:
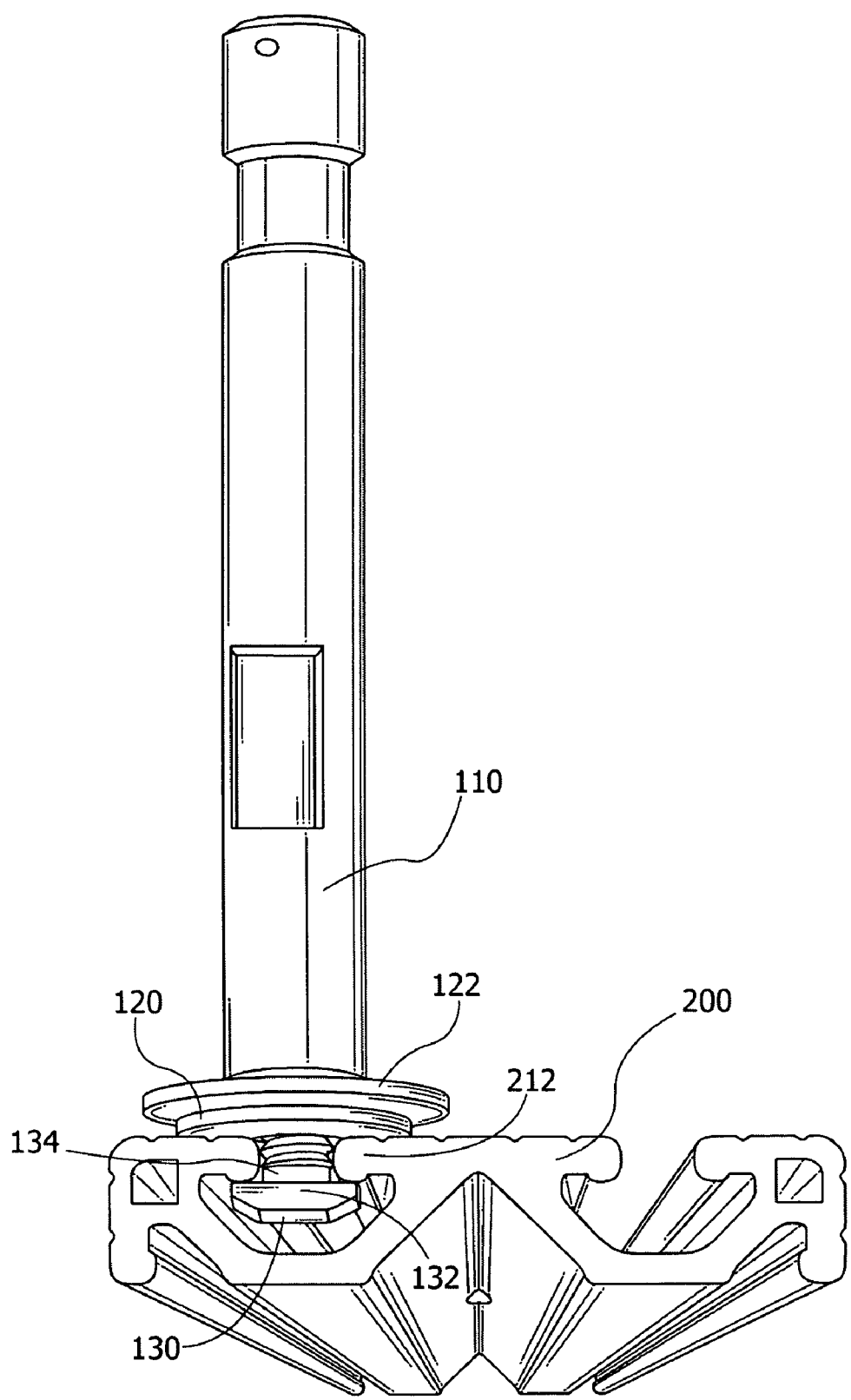
FIG. 3C is a side view of a support extension for stage apparatus secured into a support rail according to the invention.

FIG. 3B is a side view showing the support pin 100 for stage apparatus placed into the rail 200, and FIG. 3C is a side view showing the support pin 100 for stage apparatus secured onto a rail according to the invention. When initially turning the pin body 110 clockwise, the cam portion of the collar 134 of the t-bolt 130, by virtue of its shape, automatically aligns the head 132 of the t-bolt generally perpendicularly to the channel 210. The cam portion of the collar 134 contacts the inner edge of lips 212 of the rail 200 to align the head 132 of the t-bolt. By rotating the pin body 110 clockwise, the t-bolt 130 is screwed into the receiving cavity within the pin body 110. The t-bolt 130 is held in a stationary position by the cam portion of the collar 134 contacting the inner edge of lips 212 of the rail 200. By rotating the pin body 110 clockwise, the male threads of the cylindrical portion 138 of the t-bolt 130 are drawn by the corresponding female threads of the cavity of the pin body 110 into the cavity of the pin body 110. This causes the underside of the head 132 of the t-bolt 130 to contact the underside of the lips 212.

As the pin body 110 is tightened, the head 132 "grabs" the underside of the lips 212. Friction results from this "grabbing." The friction is important in that it helps in forming the attachment of the support pin 100 with the rail 200. The friction may be enhanced by the use of a ribbed, rough, textured or other pattern on the underside of the head 132.

As the pin body 110 is tightened by rotating, the washers 120 and 122 are pulled tightly flush to the top of the rail 200. The pressure of the pin body 110 against the washers 120 and 122 against the rail 200 in conjunction with the pressure of the underside of the head 132 of t-bolt 130 against the lips 212 causes the support pin 200 to be securely attached to the rail 200.

To further tighten the attachment of the support pin 100 with the rail 200, a wrench, pliers or other tool may be used to rotate the support pin.

Figure 4:
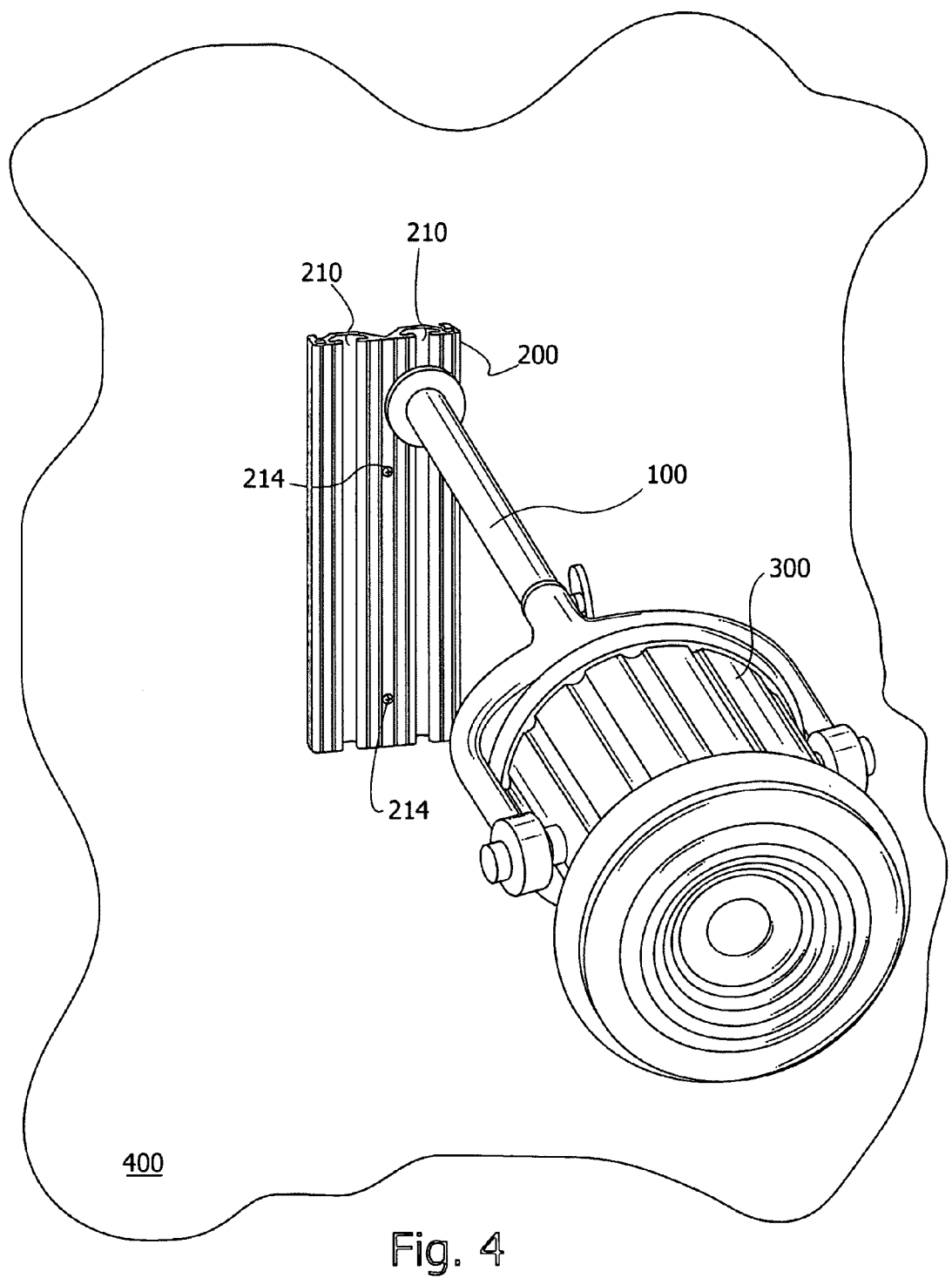
FIG. 4 is a side view of a lamp attached to a support extension for stage apparatus that is secured to a support rail which is attached to a wall according to the invention.

FIG. 4 is a side view of a lamp 300 attached to a support extension 100 for stage apparatus that is secured to a support rail 200 which is attached to a wall 400. The rail 200 may be attached to the wall 400 by screws, nails or other fastening devices placed in holes 214. After the rail 200 is attached to a wall of a stage set, the support pin 100 may be secured in channel 210 of the rail 200. The lamp 300 may then be coupled to the support pin 100. The lamp may have a junior mount, a senior mount or other mount which allows for the lamp 300 to be attached to the support extension 100.

To quickly easily release and remove the support pin 100 from the rail 200, the support pin body 110 is rotated counter-clockwise. The rotating may be achieved by hand or with a wrench, pliers or other tool. Rotating the support pin body 110, causes the threads 136 on the cylindrical portion 138 of the t-bolt 130 to recede from the cavity within the support pin body 210. As the support pin body is rotated counter-clockwise, the t-bolt 130 rotates until the cams on the collar 134 abut the internal edges of the lips 212 of the channel 210. The cams of the collar 134 align the t-bolt 130 such that the head 132 of the t-bolt is in line with, that is, is parallel with, the opening between the lips 212. In this way, the support pin 100 may be quickly easily removed from the rail 200.

In other embodiments, the t-bolt 130 is replaced with a carriage bolt or other bolt having a circular, square, hexagonal, or other shaped head. The head of the carriage bolt may be of a size that may be slid into the channel 210 of rail 200. In these embodiments, the support pin may be slid onto the end of the rail 200, as the shaped head is too large to be inserted into the channel opening between the lips 212.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the invention.

It is claimed:

1. A mounting system comprising:
   a support extension comprising a body a wide groove extending around a circumference of the body a bolt coupled with the body, the bolt to be coupled to a rail by rotating the body, the bolt intruding into a cavity in the body when the body is rotated a hole a handle of a stage equipment selected from the group comprising a fresnel lamp, an open faced lamp, a scoop lamp, a soft box, a flag, a net, a filter, a screen, and a reflector, wherein the handle is attached to the wide groove, wherein the support extension fully supports the stage equipment a pin disposed through the hole, wherein the pin is securing the stage equipment to the support extension.

2. The mounting system of claim 1 wherein the body is constructed of one of a metal, resin or plastic.

3. The mounting system of claim 1 wherein the support extension has a diameter of approximately 0.625 inches.

4. The mounting system of claim 1 wherein the body is generally cylindrical.

5. The mounting system of claim 4 wherein the body includes at least two notches to allow a wrench, a pliers or other tool to grasp the body.

6. The mounting system of claim 1 wherein the cavity includes screw threads complementary to screw threads included on a cylindrical portion of the bolt.

7. The mounting system of claim 1 wherein the bolt comprises:

a head a collar a cylindrical portion.

8. The mounting system of claim 7 wherein the collar is a shape that serves as a cam when the body is rotated.

9. The mounting system of claim 7 wherein the collar is a shape that serves as a cam when rotated such that the head becomes perpendicular to a channel opening in the rail when the body rotates.

10. The mounting system of claim 7 wherein the cylindrical portion includes screw threads complementary to screw threads included in the cavity.

11. A mounting system comprising:

a support pin comprising a pin body a t-bolt coupled with the pin body the support pin to be coupled to a rail by rotating the pin body a hole a stage equipment selected from the group comprising a lighting equipment and a grip equipment, wherein the stage equipment is attached to the pin body, wherein the support pin fully supports the stage equipment a pin disposed through the hole, wherein the pin is securing the stage equipment to the support pin and wherein the t-bolt comprises a head a collar a cylindrical portion and wherein the collar is a shape that serves as a cam when the pin body is rotated.

12. A mounting system comprising:

a support pin comprising a pin body a t-bolt coupled with the pin body the support pin to be coupled to a rail by rotating the pin body a hole a stage equipment selected from the group comprising a lighting equipment and a grip equipment, wherein the stage equipment is attached to the pin body, wherein the support pin fully supports the stage equipment a pin disposed through the hole, wherein the pin is securing the stage equipment to the support pin and wherein the t-bolt comprises a head a collar a cylindrical portion and wherein the collar is a shape that serves as a cam when rotated such that the head becomes perpendicular to a channel opening in the rail when the pin body rotates.

* * * * *